United States Patent [19]

Suh et al.

[11] 4,268,465
[45] May 19, 1981

[54] METHOD OF ACCELERATING THE COOLING OF POLYMERIC ARTICLES

[75] Inventors: Nam P. Suh, Sudbury; Lewis Erwin, II, Belmont, both of Mass.

[73] Assignee: Massachusetts Institute of Technology, Cambridge, Mass.

[21] Appl. No.: 51,181

[22] Filed: Jun. 22, 1979

Related U.S. Application Data

[63] Continuation of Ser. No. 872,752, Jan. 27, 1978, abandoned, which is a continuation of Ser. No. 628,964, Nov. 5, 1975, abandoned.

[51] Int. Cl.³ ............................................... H05B 1/00
[52] U.S. Cl. ........................................ 264/25; 264/83; 264/126
[58] Field of Search ........................... 264/25, 83, 126

[56] References Cited

U.S. PATENT DOCUMENTS

| | | | |
|---|---|---|---|
| 2,714,076 | 7/1955 | Seckel | 264/126 |
| 3,963,845 | 6/1976 | Dukess | 264/25 |
| 3,971,839 | 7/1976 | Taylor | 264/126 |
| 3,975,481 | 8/1976 | Baumgaertner | 264/126 |

Primary Examiner—Donald E. Czaja
Assistant Examiner—James R. Hall
Attorney, Agent, or Firm—Robert F. O'Connell

[57] ABSTRACT

A method of accelerating the cooling of articles made from polymeric particles, such as thermoplastic particles, in which compacted particles are subjected to a heat effect so that selected regions thereof are preferentially heated and the remaining regions thereof remain substantially unheated to produce a heterogeneous temperature distribution within the particles. When the heating effect is removed the preferentially heated regions cool in a rapid fashion by heat transfer therefrom to the unheated regions thereof.

15 Claims, 5 Drawing Figures

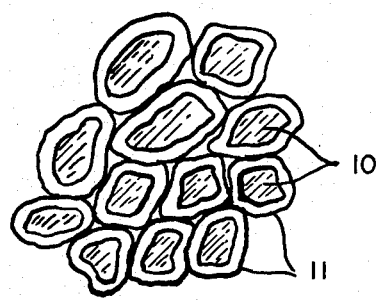
FIG.1
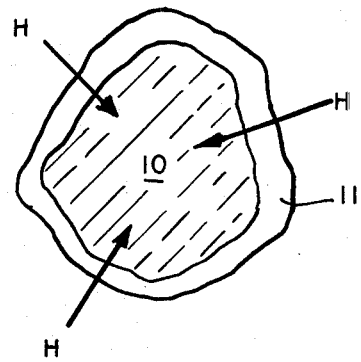
FIG.2
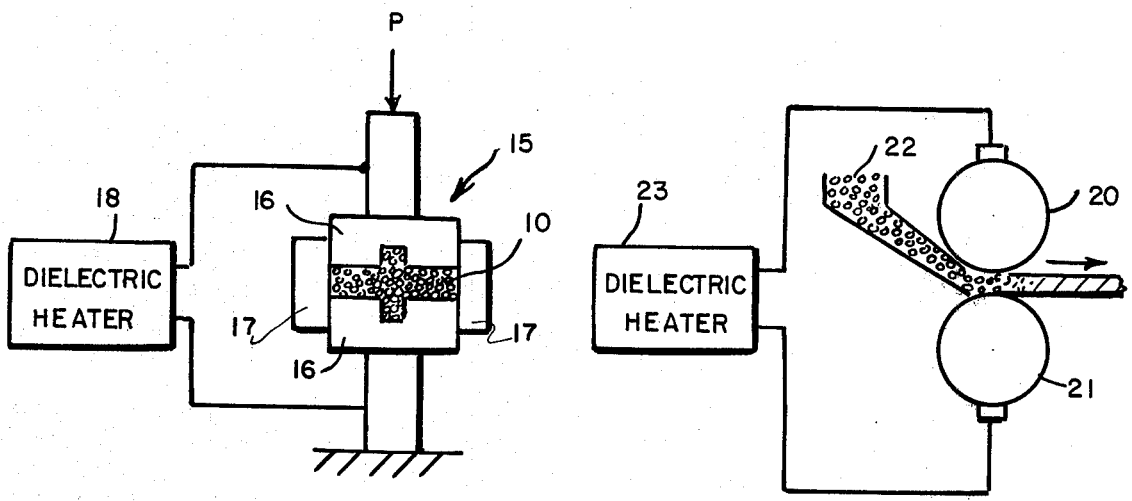
FIG.3
FIG.4
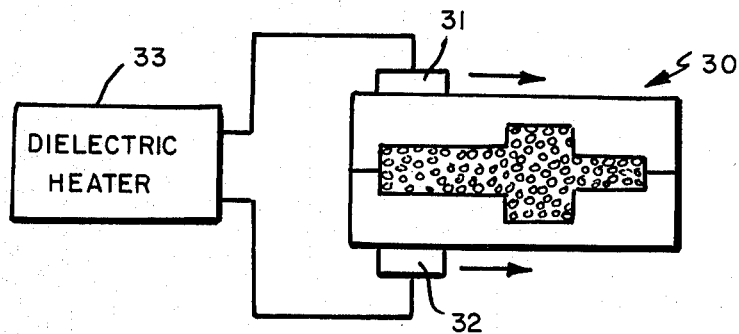
FIG.5

METHOD OF ACCELERATING THE COOLING OF POLYMERIC ARTICLES

The Government has rights in this invention pursuant to Cooperative Agreement Number CG-0006 awarded by the National Science Foundation.

This application is a continuation of Ser. No. 872,752, filed Jan. 27, 1978, now abandoned which is a continuation of Ser. No. 628,964, filed Nov. 5, 1975, now abandoned.

INTRODUCTION

This invention relates to methods for producing articles made of polymeric materials or materials encapsulated with polymeric materials and, more particularly, to methods for improving the thermal cycle times required for the production thereof.

BACKGROUND OF THE INVENTION

In conventional techniques for molding polymeric articles, granular or powder particles of a polymeric material are melted and injected into a mold at high temperatures under suitable pressures. The polymer melt is then cooled until the article reaches a point where it is sufficiently rigid to allow its removal from the mold. While the cooling time for relatively small articles is satisfactory in many applications, when the article which is being fabricated is relatively large the cooling time can be significantly long thereby making a conventional molding operation slow and expensive when forming large plastic articles. It is estimated that the cooling time tends to increase as the square of a typical dimension of the piece which is being formed so that conventional techniques for molding articles from polymer thermoplastic become substantially non-competitive unless the article is either limited in its overall size or limited in the thickness thereof.

BRIEF SUMMARY OF THE INVENTION

In accordance with the invention, in order to improve the overall molding operation and to reduce the thermal cycling time for forming polymeric articles, particularly where the pieces to be formed are relatively large, internal heat sinks are used to lessen the distance over which heat transfer must take place during cooling. This is accomplished by using a combination of a molding material and heating effect therefor which will generate an advantageous heterogenous temperature distribution within the material. In accordance therewith selected regions, such as the surface region of particles, are preferentially heated and the remaining regions, such as the interior regions of particles, remain unheated. When the heating effect is removed, the preferentially heated regions cool very rapidly by heat transfer therefrom to the unheated regions.

In one form this invention may be applied using a molding material wherein the surfaces of polymeric particles which are used in the fabrication process are appropriately treated so as to form a surface layer thereon having characteristics which, when subject to heating effects, cause the surface to melt without heating the interior, or core, of the particles. In one embodiment thereof, for example, a low dielectric loss particle is coated with a relatively thin layer of a polar thermoplastic material having higher dielectric loss characteristics than the dielectric loss characteristics of the core material. When such particles are subject to a dielectric heating process in a mold, the surface layer melts relatively rapidly, well before the interior core is heated to any great extent, and the surfaces of the particles thereupon fuse to form bonds therebetween. When the particle surfaces have been so fused and the dielectric heating field is removed, a heterogenous temperature distribution exists within the material so that the surface heat is transferred rapidly from the surface layer of each of the particles into the core region thereof so that rapid cooling of the particles and, hence, of the overall article occurs and the latter becomes sufficiently rigid to permit its removal from the mold.

Thus, the time required to fabricate the overall article is reduced considerably over that required in conventional methods where substantially the entire bulk of each of the particles is required to be heated to a sufficient temperature to provide the necessary fusion thereof.

DESCRIPTION OF THE INVENTION

The invention can be described in more detail with the help of the accompanying drawings wherein FIG. 1 shows a diagrammatic view of a plurality of adjacent polymeric particles having high loss surface layers for permitting fusion thereof in accordance with the invention;

FIG. 2 shows an enlarged view of a particle of FIG. 1;

FIG. 3 shows a simplified diagrammatic view of an apparatus which can be used in practicing the technique of the invention;

FIG. 4 shows another simplified diagrammatic view of an apparatus which can be used in practicing the techniques of the invention; and FIG. 5 shows still another simplified diagrammatic view of an apparatus which can be used in practicing the technique or the invention.

In accordance with the technique of the invention particles of low dielectric loss material, as depicted by particles 10 in FIGS. 1 and 2, are used. Such particles may be termoplastic materials of the non-polar type, such as polyolefins, polystyrene, fully fluorinated polymers, isoprene. and the like which may be obtained from oppropriate manufacturers thereof for use in forming a plastic article. Such thermoplastic materials have substantially low dielectric loss characteristics so that when subjected to a high frequency dielectric field, as in a dielectric heating apparatus, no substantial heating thereof occurs. Each of the particles 10 has a surface portion 11 which is appropriately created so as to provide a surface layer which has relatively high dielectric loss characteristics so that when it is subjected to a high frequency dielectric field it will heat relatively rapidly to the melting point thereof.

For example, an appropriate method for creating the surface of particles 10 is to coat such particles with a polar polymer plastic material having relatively high dielectric loss properties. Such plastics as polyvinyl chloride (PVC) and polyvinylidene chloride (PVDC), as well as other polar polymers, are suitable for such purpote. The particles are then compacted into a mold under pressure and are thereupon subjected to a high frequency dielectric field which produces a dielectric heating effect.

Such a process is shown in a simplified diagrammatic form in FIG. 3 wherein an examplary mold 15 is formed from an insulative sleeve 17 and a pair of movable electrically conductive elements 16 forming the mold shape, elements 16 being vertically movable within the insulative sleeve 17. The coated thermoplastic particles are placed within the mold and the entire mold is subjected to a suitable pressure P. Electrically conductive elements 16, for example, also operate as effective electrodes which are appropriately conneted to the output terminals of a dielectric heating apparatus 18 of a conventional type which can supply a radio frequency electric field at an appropriate frequency such as 25 MHz, for example.

When the particles are subjected to pressure P and to the heating effect of the dielectric heating apparatus, the temperature of the surface layers 11 of the particles 10 rises rapidly to a temperature lever at which only the surface layers, and not the cores 10 thereof, melt and fuse together. when the dielectric heating apparatus is turned off, the surface layers 11 cool relatively rapidly as the heat therein is transferred therefrom into the interior region of the core 10 of each of the particles as shown diagrammatically by the arrows H in FIG. 2. During the fusion process the pressure exerted on the mold tends to further compact the particles so as to increase the strength of the overall article upon cooling. When the temperature has equilibrated across each particle the compacted molded article is relatively rigid and can be removed from the mold.

If the surface layer 11 is to be formed of a coating of a high dielectric less material, appropriate coating techniques known to the art may be utilized for such purpose. Examples of such techniques include powder coating, solvent coating, melt coating, and chemical deposition methods, all well known to the art.

Rather than coating the surfaces of the particles, non-polar polymeric particles may be appropriately treated chemically in order to increase their dielectric loss characteristics. In one such method, a non-polar thermoplastic core material may be exposed to chlorine which causes a chemical reaction in which a chlorinated layer of the core material is formed on the surfaces of each of the particles, the chlorinated layer having a relatively high dielectric loss. The use of such a reacted layer of high dielectric loss characteristics provides substantially the same effect as the use of a coated material in that the surface layer of each particle heats relatively rapidly when subjected to the field of a dielectric heating apparatus substantially without heating the core thereof and, when the dielectric field is subsequently removed, rapid cooling of the melted and fused surface layers occurs by heat transfer therefrom into the cores thereof.

Although the process has been discussed above with respect to the use of surface layers having high dielectric loss characteristics when subject to dielectric heating effects, other forms of heating for providing the desired heterogeneous temperature distribution may be utilized for the surface regions of the particles. For example, induction heating techniques may be utilized when the particle surfaces are treated so as to provide high magnetic losses thereat. When subjected to high frequency electromagnetic fields (i.e., an induction heating effect), the high magnetic losses at the surface regions cause them to heat rapidly with substantially little or no heating of the non-magnetic interior core regions thereof. Alternatively, a surface active heating effect may be used, such as provided by the application of ultrasonic energy thereto, whereupon a relatively rapid heating of the surface regions occurs followed by a rapid cooling thereof by heat transfer from the surface into the interior core region of the particles.

While the heating effect may be applied to all regions of the overall article simultaneously, such simultaneous application is not always necessary. For example, different portions of the article may be heated sequentially. Thus, as shown diagrammatically in FIG. 4, a mold may be in the form of a pair of appropriately shaped rollers 20 and 21 between which the particles are fed from an appropriate supply 22 thereof. The rollers themselves can act effectively as electrodes connected to a suitable dielectric heating apparatus 23. The particles supplied to the mold are subjected to the dielectric heating effect and as they fuse and are passed outwardly from the roller mold, rapid cooling takes place. Thus, sequential portions of the overall article which is being formed are heated and cooled rather than the entire article at once. Alternatively, as shown in simple diagrammatic form in FIG. 5 the particles may be placed in a flexible, or a rigid, mold 30, appropriate movable electrodes 31 and 32 connected to a dielectric heater 33 being passed along the exterior of the mold subjecting sequential portions of the particles within the mold to the dielectric heating effect.

The higher the temperature which is reached during the heating process the lower the viscosity of the melted thermoplastic surface layer and the greater the flow thereof. Accordingly, if higher surface temperatures are reached, less pressure is required in order to maintain compaction of the molded article.

In addition to the aforesaid advantages, when molding from particulate material, reinforcing fibers can easily be incorporated in the molding material by dry blending.

In one specific example of the invention, particles of polystyrene having diameters between about 1.0–2.0 millimeters (mm.) were coated, by a powdered coating method, with an equal weight of powdered polyvinyl chloride, the coated particles being placed in a mold and heated dielectrically for 1.5 seconds. The power expended in the heating process was at least 300 watts per cubic centimeter (watt /c.c) of molding material while subjecting the molding composition to a pressure sufficient to accomplish compaction thereof. The molded article which was thereby produced exhibited a flexural strength of about 2500 psi. This flexural strength was observed to be limited by the strength of the bond within the particles between the surface coating and core material, as created in the coating process, rather than by the strength of the bond created between the particles during the molding operation.

In another specific example of the invention polypropylene particles approximately 1.0–2.0 mm. in diameter of an injection molding grade were treated with chlorine which was bubbled through an aqueous suspension of the particles under actinic light at 60° C. A chlorinated layer was formed at the surface of the particles, the chlorinated layer containing 30% by weight of chlorine to a depth of approximately 0.1–0.2 mm. The treated particles were placed in a mold and heated dielectrically for 2.0 seconds, the power expended being at least 300 watts/c.c. of molding material while the molding composition was subjected to a pressure sufficient to accomplish compaction thereof. The molded article produced thereby exhibited a flexural strenth of about 4100 psi.

It can be shown from a heat conduction analysis of the process of the invention as described herein that the power required per unit volume of molding material to carry out the process of the invention varies as the inverse square of the particle size and that the preferred ratio of the average radius of the particle core to the average radius of the surface layer thereof should lie within a range of about 0.7 to 0.9, with the ratio under such analysis preferentially being about 0.775 for optimal results. Further, the sizes of the particles which are used herein should preferably be such that the average diameter thereof is at least about 0.5 mm.

What is claimed is:

1. A method of forming a solid article from a plurality of polymeric particles, each of said particles having at least one selected region substantially responsive to heating by the application of high frequencey wave energy and at least one remaining region substantially unresponsive to the application of said energy, said method comprising:
   a. applying pressure and said wave energy to all of said particles in a mold, the selected region of each of substantially all of said particles responding to said applied energy substantially simultaneously so that said selected regions are heated substantially simultaneously by said applied energy to a temperature such that the selected regions of adjacent particles are capable of fusing, the remaining region of each of substantially all of said particles being substantially unresponsive to said applied energy so that said remaining regions are only insubstantially heated by said applied energy, whereby a heterogeneous temperature distribution is produced within each of substantially all of said particles, said selected regions of adjacent particles fusing together; and
   b. stopping the application of said energy to permit said heterogeneous temperature distribution to proceed to equilibrium by internal heat dissipation within each of substantially all of said particles from said selected regions to said remaining regions, so that said particles become firmly bonded together to from said solid article.

2. A method of forming a solid article, having a preselected shape, from a plurality of polymeric particles, comprising the steps of:
   a. treating the surface region of each of substantially all of said particles to alter the thermal characteristics thereof, to render said surface regions substantially responsive to heating by the application of high frequency wave energy while the interior of each of substantially all of said particles remains substantially unresponsive to the application of said energy;
   b. placing said particles in a mold having said preselected shape;
   c. applying pressure and said wave energy to all of said particles in said mold, the surface region of each of substantially all of said particles responding to said applied energy substantially simultaneously so that all of said surface regions are heated substantially simultaneously by said applied energy to a temperature such that the surface regions of adjacent particles are capable of fusing, the interior region of each of substantially all of said particles, being substantially unresponsive to said applied energy is only insubstantially heated by said applied energy, whereby a heterogeneous temperature distribution is produced within each of substantially all of said particles; said surface regions of adjacent particles fusing together; and
   d. stopping the application of said energy to permit said heterogeneous temperature distribution to proceed to equilibrium by internal heat dissipation within each of substantially all of said particles from said surface regions to said interior regions, so that said particles become firmly bonded together to form said solid article.

3. The method of claim 2 wherein said particles are thermoplastic particles.

4. The method of claim 2 wherein said surface treating step comprises coating the surfaces of said particles with a material which is substantially responsive to heating by the application of said high frequency wave energy.

5. The method of claim 4 wherein said particles are non-polar thermoplastic particles and said coating material is a polar thermoplastic material.

6. The method of claim 2 wherein said surface treating step comprises subjecting said particles to a chemical reaction to form a chemically reacted layer at each of the surfaces thereof.

7. The method of claim 6 wherein said surface treating step comprises exposing said particles to chlorine to form a chlorinated layer on each of the surfaces thereof.

8. The method of claim 2 wherein said thermal characteristics which are altered are the dielectric loss characteristics and further where:
   in step (a) said treating provides the surface region of each of substantially all of said particles with a higher dielectric loss characteristic therein than that in the untreated interior region; and
   in step (c) said wave energy includes alternating electric fields.

9. The method of claim 2 wherein:
   step (a) comprises treating said surface regions so as to provide magnetic loss characteristics which are higher than the magentic loss characteristics of said interior regions, and
   step (c) comprises subjecting said particles in said mold under pressure to alternating magnetic fields having sufficient energy to render the treated surfaces of said particles capable of fusing.

10. The method of claim 1 wherein:
    step (a) comprises subjecting said particles to sufficient ultrasonic energy to fuse the surface regions of substantially all of said particles.

11. The method of claim 1 or of claim 2 wherein said particles each have an average diameter which is at least about 0.5 mm.

12. The method of claim 2 wherein said particles are selected such that said particles each has an average diameter which is at least about 0.5 mm and the ratio of the average radius of the interior region to the average radius of the surface regions of each of said particles lies in a range from about 0.7 to about 0.9.

13. The method of claim 12 wherein said ratio is about 0.775.

14. A product made in accordance with the method of claim 1.

15. A product made in accordance with the method of claim 2.